United States Patent [19]
Porter

[11] Patent Number: 5,869,083
[45] Date of Patent: Feb. 9, 1999

[54] BOLUS FOR SUPPLYING BIOLOGICALLY BENEFICIAL SUBSTANCES TO RUMINANT ANIMALS

[76] Inventor: William Leslie Porter, Animax Limited, Shepherds Grove West, Stanton, Bury St. Edmunds, Suffolk IP31 2AR, England

[21] Appl. No.: 876,614

[22] Filed: Jun. 16, 1997

Related U.S. Application Data

[63] Continuation-in-part of Ser. No. 588,125, Jan. 18, 1996, abandoned.

[30] Foreign Application Priority Data

Feb. 1, 1995 [GB] United Kingdom .................. 9501914
Oct. 5, 1995 [GB] United Kingdom .................. 9520326

[51] Int. Cl.⁶ ................................................... A23K 1/18
[52] U.S. Cl. ...................... 424/438; 424/639; 424/641; 424/646; 424/667; 426/807
[58] Field of Search ................................ 424/438, 639, 424/641, 646, 667; 426/807

[56] References Cited

U.S. PATENT DOCUMENTS

| 2,512,537 | 6/1950 | Zellers | 99/2 |
| 2,683,664 | 7/1954 | Greer | 99/2 |
| 2,999,752 | 9/1961 | Webb | 99/2 |
| 3,696,189 | 10/1972 | Snyder | 99/2 |
| 4,732,764 | 3/1988 | Hemingway | 424/438 |
| 5,236,717 | 8/1993 | Vinci | 426/2 |
| 5,310,555 | 5/1994 | Zimmer | 424/438 |

*Primary Examiner*—D. Gabrielle Brouillette
*Attorney, Agent, or Firm*—Edwin D. Schindler

[57] ABSTRACT

An intra-ruminal, slow release bolus for supplying a biologically beneficial substance to a ruminant animal, wherein the beneficial substance, in the form of a relatively high density particulate such as copper oxide, is incorporated in a cylindrical block of a solid, non-toxic binding substance such as salt or sugar which in use dissolves and/or disperses within at most a few hours in the ruminant stomach, leaving the beneficial substance retained in the ruminant stomach for slow release over a period of months.

20 Claims, No Drawings

BOLUS FOR SUPPLYING BIOLOGICALLY BENEFICIAL SUBSTANCES TO RUMINANT ANIMALS

RELATED APPLICATIONS

This application is a continuation-in-part of my application Ser. No. 08/588,125, filed Jan. 18, 1996, now abandoned.

FIELD OF THE INVENTION

This invention relates to an intra-ruminal, slow release bolus for supplying biologically beneficial substances, such as trace elements, to ruminant animals such as cattle, sheep, goats and deer.

BACKGROUND TO THE INVENTION

Particulate materials of high density, for example rods or filaments of oxidised copper, are administered by mouth to ruminant animals for the purpose of nutritional supplementation or medicinal treatment, more especially for the treatment of trace element deficiencies.

Such orally administered high density particulate material is employed because particles of appropriate size and density lodge for prolonged periods in the ruminant stomachs. Slow solution of the active substance, e.g. trace element or trace elements, takes place. The duration for which the active substance remains effective can extend to several months and, for example, up to one year in the case of a copper oxide particulate.

Oral administration of these high density particulate materials is especially suitable for ruminant animals grazed extensively, handled infrequently and not receiving supplementary feeding.

Material such as particulate copper oxide rods or filaments is normally administered in the form of individual doses. The appropriate dose is commonly contained within a capsule of gelatin, which dissolves rapidly in the ruminant stomach. The filled gelatin capsule is of high relative density, usually 2 or more, which prevents it from being regurgitated. The gelatin typically dissolves within about 15 minutes, when in contact with the aqueous contents of the rumen or reticulum, and the released particles, being of high density, tend to sink to the bottom of whichever part of the ruminant stomach they are in. The particulate character and weight of the beneficial material causes very delayed passage through the parts of the ruminant stomach, lasting up to several months, thus giving prolonged effective treatment from a single administered dose.

Existing boluses are relatively expensive, mainly due to the high cost of the gelatin capsules when compared with the cost of the material to be administered.

The present invention therefore has as a principal object to provide an alternative and less expensive bolus for administration to ruminant animals. Moreover, increasingly strict control of animal-derived substances such as gelatin, to prevent spread of disease, make it desirable to provide a means of administration of particulates such as copper oxide rods or filaments for which gelatin is not required.

BRIEF SUMMARY OF THE INVENTION

According to the invention there is provided an intra-ruminal, slow release bolus for supplying a biologically beneficial substance to a ruminant animal, comprising a body of a solid, non-toxic binding substance of any one or mixture of salt, sugar, starch, microcrystalline cellulose, a soluble gum such as agar-agar, and cereal flour which will dissolve and/or disperse in the ruminant stomach and in which a dose of a particulate of the beneficial substance is incorporated, said particulate being of such a density that it will be retained in the ruminant stomach after the binding substance has dissolved and/or dispersed and comprising any one or mixture of zinc, copper, oxides thereof and alloys thereof.

It is essential that the binding substance be one which dissolves and/or disperses relatively rapidly in the ruminant stomach. The dissolving and/or dispersing period, and thus commencement of release of the particulate material, should be complete within seven days, preferably less than one day, more preferably less than two hours, and ideally within between five and sixty minutes.

An especially suitable binding substance is, for example, a mixture comprising salt, cereal flour and pectin. Alternatively, a mixture of salt and maize starch is suitable.

The block of the binding substance is preferably formed, as by moulding, into a cylindrical shape, rounded at least at one end in order to facilitate passage through the gullet of the animal.

Specific examples of particulate materials which may be carried by the binding substance forming the bolus are particulate copper oxide, preferably in the form of rods or filaments, and particulate elemental zinc. The relative density and size of the particulate are such as to ensure prolonged residence in the ruminant stomach, i.e. residence for a period of not less than one month of a useful proportion of the administered dose.

According to a further optional feature of the invention, the bolus is coated with a non-sticky coating which, after administration of the bolus, is removed by solution or abrasion. One suitable coating material is caster sugar, applied for example in a coating pan. Other possible coating materials are thinly applied shellac, for example applied as shellac emulsion, and a wax such as Carnauba Wax or beeswax, which may also be applied as emulsions or in the molten state.

According to a still further feature of the invention, the above-described bolus for administration of particulate material such as copper oxide or zinc, is combined with a second body of a resin material, preferably a rosin, which incorporates at least one different biologically (pharmaceutically or medicinally) beneficial substance for a ruminant animal. Examples of such different biologically beneficial substances are selenium compounds, cobalt compounds, iodine compounds, manganese or compounds thereof, zinc compounds such as zinc oxide for control of fungal toxicoses, vitamins, lipids, amino-acids and medicaments such as anthelmintics. The two bodies are bound together for simultaneous oral administration to the ruminant animal.

The two bodies may be bound together in a variety of ways, for example by moulding the first body formed of a dissolving and/or dispersing binding substance around the rosin body, or vice versa, by fixing the two bodies together end to end with a soluble or dissembling binding tape, or fixing the two bodies end to end in a cardboard or like disintegrating or dissolving connecting tube.

The bolus in accordance with the invention may be produced by use of a mould having a shaped moulding chamber and a reservoir space which is filled with a meltable powder capable of forming a binding substance and with a dose of a relatively high density particulate of a material beneficial to a ruminant animal. The mould is heated, with the reservoir above the chamber, to melt the powder and enable the melted powder and the beneficial material to fall and condense into the chamber with limited protrusion into a neck. The mould is then cooled to allow the melted powder to solidify into a solid block of binding substance carrying the beneficial particulate material, the mould is opened to enable the moulded bolus to be extracted, and the moulded bolus is trimmed of any protrusion.

An alternative method of producing the bolus, especially in the case where powdered salt is included in the binding substance, comprises moulding a mixture of the binding substance with a dose of a relatively high density particulate of a material, for example copper oxide filaments or needles, beneficial to a ruminant animal, wherein the mixture is wetted by a relatively small quantity of water or an aqueous solution of a non-toxic solvent, the wet mixture is compressed into a mould having a shaped moulding chamber, the mould is heated to drive off the water, and the bolus is extracted from the mould after cooling.

Preferably, the moulding chamber is cylindrical with a rounded end.

DESCRIPTION OF EMBODIMENTS

Boluses and methods of production thereof in accordance with the invention are now further described by way of example.

EXAMPLE 1

15 g of granulated sugar and 20 g of copper oxide particles, in the form of rods or filaments of approximately 0.5 mm diameter and 2 to 5 mm in length, were placed in a split silicon rubber mould having a bolus chamber connected through a short neck to an overhead reservoir chamber. 10 g of sugar were first loaded into the mould, followed by the copper oxide particles, followed by 5 g of sugar at the top. The sugar used may be sucrose, lactose, glucose or fructose, for example, or a crude mixture such as molasses may alternatively be employed.

After shaking or vibration, the filled mould was placed in a fan oven, at 155 degrees C., for a period of 2½ hours.

The constituents of the mould settled into the bolus chamber with melting of the sugar, with a small protrusion upstanding at the neck. The mould was subsequently slowly cooled, and the bolus extracted and trimmed.

The resultant bolus, of cylindrical shape with moulded ends (resulting from the shape of the bolus chamber) constituted a solid block of binding material (resolidified sugar) in which the copper particles were embedded, mainly in a central region of the length of the bolus.

As an optional step, a surface coating of Carnauba Wax was applied by repetitive spraying.

The bolus was tested by placing it in water at 37 degrees C. and shaking gently on a planetary shaker. The bolus was found to disintegrate, by solution of the binding material, within 15 minutes, releasing the copper oxide particles.

It has been found possible to combine the above-described bolus of dissolving binding material with a resin, most preferably a rosin, body, in which the rosin acts as a binding substance in which a different biologically beneficial substance is uniformly dispersed. In use, the rosin body remains in the alimentary tract over a long period, the beneficial substance being slowly released by leaching over this long period.

The combination bolus may be produced by moulding the sugar or equivalent bolus around the rosin body, or vice versa, or by fixing the two single bodies end to end using a dissolving tape or a cardboard connecting tube.

EXAMPLE 2

25 g of copper rods or filaments as previously referred to are mixed with 6 g powdered salt, 0.2 g cereal flour, 0.1 g pectin and 2 g gum arabic, together with 4 ml water as a wetting agent. The wet mixture is tamped into a mould having a bolus shaped moulding chamber. The mould is then heated to drive off water and the resultant solid bolus extracted after cooling.

EXAMPLE 3

The same method as Example 2 is employed, but with a mixture comprising 25 g copper particulate, 12 g powdered salt, 0.2 g cereal flour, 0.1 g pectin and 4 ml water.

EXAMPLE 4

The same method as Examples 2 and 3 is employed, but with a mixture comprising 25 g copper particulate, 4 g powdered salt, 0.2 g cereal flour, 0.1 g pectin, and 4 ml water.

In general, in the second method exemplified by Examples 2 to 4, it is preferred to employ a ratio by weight of binding material, salt and starch for example, to copper needles, in the range 3:1 to 1:10, preferably 2:1 to 1:6, mixed with ½ to 20 ml, preferably 3 to 10 ml water or any aqueous solution of a non-toxic solution, preferably saturated, of a solute such as magnesium sulphate, cobalt chloride, sodium chloride, sodium silicate or potassium iodide.

Instead of employing salt and starch as the binding substance, the starch can be replaced by microcrystalline cellulose, agar-agar, a gum such as xanthan, pectin or cereal flour, or any combination thereof with or without the starch, as typified by the examples.

Assuming the use of powdered salt and starch, the amount of salt used for a bolus to carry 25 g copper particulate is between 1 g and 10 g, preferably 2 g and 6 g, whilst the amount of starch used is in the range 1 g to 20 g, preferably 3 g to 10 g.

Instead of or in addition to copper particulate, particulate zinc can be incorporated, preferably in elemental form, or a copper and/or zinc alloy particulate such as a brass particulate may be incorporated.

It has also been possible to prepare the sugar-based bolus of Example 1 by the second method, using a small quantity of saturated sugar solution as a wetting agent.

I claim:

1. An intra-ruminal, non-gelatin bolus for supplying a biologically beneficial substance to a ruminant animal, comprising a non-gelatin body of a solid, non-toxic binding substance of any one or mixture of salt, sugar, starch, microcrystalline cellulose, a soluble gum and cereal flour which will dissolve and/or disperse in the ruminant stomach and in which a dose of a particulate of the beneficial substance is incorporated, said particulate being of such a density that it will be retained in the ruminant stomach after the binding substance has dissolved and/or dispersed and comprising any one or mixture of zinc, copper, oxides thereof and alloys thereof.

2. A bolus according to claim 1, comprising a moulded cylindrically shaped block rounded at least at one end.

3. A bolus according to claim 1, in which the binding substance has a dissolving and/or dispersing period in the ruminant stomach not exceeding seven days.

4. A bolus according to claim 3, in which the beneficial substance is retained in the ruminant stomach for at least one month.

5. A bolus according to claim 1, in which the biologically beneficial substance incorporated in the bolus is at least one of particulate copper oxide and particulate zinc.

6. A bolus according to claim 1, in which the dissolving and/or dispersing binding substance comprises a mixture of salt, cereal flour and pectin.

7. A bolus according to claim 5, in which the rapidly dissolving binding substance comprises a mixture of salt, cereal flour and pectin.

8. A bolus according to claim 5, in which the rapidly dissolving and/or dispersing binding substance comprises a mixture of salt and maize starch.

9. A bolus according to claim 1, wherein said body is a first body and further comprising a second body wherein said first body is formed around said second body, said second body being formed of a resin material having a biologically beneficial substance incorporated therein, said biologically beneficial substance of said second body being different from that of said first body, for simultaneous oral administration to the ruminant animal.

10. A bolus according to claim 1, further comprising a non-sticky coating for said bolus.

11. A bolus according to claim 10, wherein said non-sticky coating is a member selected from the group consisting of caster sugar, shellac and a wax.

12. A bolus according claim 11, wherein said wax is a member selected from the group consisting of Carnauba wax or beeswax.

13. An intra-ruminal, non-gelatin bolus for supplying a biologically beneficial substance to a ruminant animal, comprising:

a first body of a solid, non-gelatin, non-toxic binding substance of any one or a mixture of a salt, sugar, starch, microcrystalline cellulose, a soluble gum and cereal flour, which will dissolve and/or disperse in the stomach of the ruminant animal and in which a dose of a particulate of the biologically beneficial substance for said first body is incorporated, said particulate being of such a density that it will be retained in the stomach of the ruminant animal after the non-toxic binding substance has dissolved and/or dispersed and further including any one or a mixture of zinc, copper, oxides thereof and alloys thereof; and, a non-gelatin, second body wherein said first body is formed around said second body, said second body being formed of a resin material having a biologically beneficial substance incorporated therein, said biologically beneficial substance of said second body being different from that of said first body, for simultaneous oral administration to the ruminant animal.

14. A bolus according to claim 13, wherein said second body is made of a rosin material.

15. A bolus according to claim 13, wherein said biologically beneficial substances incorporated into said second body is a member selected from the group consisting of a selenium compound, a cobalt compound, an iodine compound, manganese or a compound thereof, a zinc compound, a vitamin, a lipid, an amino acid, a medicament and a combination thereof.

16. The bolus according to claim 15, wherein said zinc compound is zinc oxide.

17. The bolus according to claim 15, wherein said medicament is an anthelmintic.

18. A bolus according to claim 13, further comprising a non-sticky coating for said bolus.

19. A bolus according to claim 18, wherein said non-sticky coating is a member selected from the group consisting of caster sugar, shellac and a wax.

20. A bolus according claim 19, wherein said wax is a member selected from the group consisting of Carnauba wax or beeswax.

* * * * *